(12) United States Patent
Okayasu et al.

(10) Patent No.: US 10,752,032 B2
(45) Date of Patent: Aug. 25, 2020

(54) PRINTER

(71) Applicant: Seiko Instruments Inc., Chiba-shi, Chiba (JP)

(72) Inventors: Takanori Okayasu, Chiba (JP); Tomohiro Murata, Chiba (JP); Takashi Yamamoto, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 0 days.

(21) Appl. No.: 16/211,852

(22) Filed: Dec. 6, 2018

(65) Prior Publication Data
US 2019/0176497 A1    Jun. 13, 2019

(30) Foreign Application Priority Data

Dec. 8, 2017    (JP) ................................ 2017-235691

(51) Int. Cl.
| | |
|---|---|
| *B41J 29/02* | (2006.01) |
| *H04N 1/00* | (2006.01) |
| *B41J 2/32* | (2006.01) |
| *B41J 3/46* | (2006.01) |
| *B41J 29/13* | (2006.01) |

(52) U.S. Cl.
CPC ................ *B41J 29/02* (2013.01); *B41J 2/32* (2013.01); *B41J 3/46* (2013.01); *B41J 29/13* (2013.01); *H04N 1/00129* (2013.01); *H04N 1/00538* (2013.01)

(58) Field of Classification Search
CPC ....... B41J 2/32; B41J 3/46; B41J 29/13; B41J 29/02; H04N 1/00129; H04N 1/00538
See application file for complete search history.

(56) References Cited

U.S. PATENT DOCUMENTS

| | | |
|---|---|---|
| 2011/0261394 A1 | 10/2011 | Tanaka |
| 2017/0021651 A1 | 1/2017 | Yamamoto et al. |

FOREIGN PATENT DOCUMENTS

| | | |
|---|---|---|
| EP | 3075557 A2 | 10/2016 |
| JP | 2011-230330 A | 11/2011 |

OTHER PUBLICATIONS

Extended European Search Report in Europe Application No. 18210935.5, dated Apr. 9, 2019, 9 pages.

*Primary Examiner* — Lamson D Nguyen
(74) *Attorney, Agent, or Firm* — Brinks Gilson & Lione (57) ABSTRACT

A printer for printing information on a recording paper, includes: a housing, which has a recording paper receiving portion having an opening, and includes a plurality of outer surfaces including a bottom surface to be opposed to an installation surface; a printer cover, which is coupled to the housing, and is capable of opening and closing the opening; a display unit, which is removably mounted on a mounting surface other than the bottom surface among the plurality of outer surfaces, and is configured to display predetermined information; a cable having one end connected to the display unit and another end on which a connector is mounted; and a connector connecting portion to which the connector is connected.

10 Claims, 10 Drawing Sheets

PRINTER

RELATED APPLICATIONS

This application claims priority under 35 U.S.C. § 119 to Japanese Patent Application No. 2017-235691 filed on Dec. 8, 2017, the entire content of which is hereby incorporated by reference.

BACKGROUND OF THE INVENTION

1. Field of the Invention

The present invention relates to a printer.

2. Description of the Related Art

There has hitherto been known a printer, which is to be used for a point-of-sale system (POS), and includes a display unit configured to display predetermined information and a printer main body portion connected to the display unit through a cable. In this related-art printer, the display unit is arranged on a printer stand configured to support the printer main body portion.

However, in the above-mentioned related-art printer, an installation space for the printer stand is required, and hence there is room for improvement from the viewpoint of space saving at a time of installing the printer including the display unit connected to the printer main body portion through the cable.

In view of the foregoing, in this type of printer, there is a demand for a printer capable of effectively achieving space saving even when the printer includes the display unit connected to the printer main body portion through the cable.

SUMMARY OF THE INVENTION

According to one embodiment of the present invention, there is provided a printer, including: a housing, which has a recording paper receiving portion having an opening, and includes a plurality of outer surfaces including a bottom surface to be opposed to an installation surface; a printer cover, which is coupled to the housing, and is capable of opening and closing the opening; a display unit, which is removably mounted on a mounting surface other than the bottom surface among the plurality of outer surfaces, and is configured to display predetermined information; a cable having one end connected to the display unit and another end on which a connector is mounted; and a connector connecting portion to which the connector is connected.

In the above-mentioned printer according to the one embodiment of the present invention, wherein the housing has a box shape, wherein the opening is formed on a side, and wherein the mounting surface comprises a side surface on a side opposite to the opening among the plurality of outer surfaces.

In the above-mentioned printer according to the one embodiment of the present invention, wherein the display unit includes a display region on which the predetermined information is displayed, and wherein the display region has a size set to a region corresponding to the mounting surface.

In the above-mentioned printer according to the one embodiment of the present invention, wherein the connector connecting portion is formed in a lower part of the mounting surface.

In the above-mentioned printer according to the one embodiment of the present invention, wherein a recessed portion that is recessed inward from the mounting surface is formed in the lower part of the mounting surface, and wherein the connector connecting portion is formed in the recessed portion.

In the above-mentioned printer according to the one embodiment of the present invention, wherein the mounting surface has both edge portions in which a pair of elastically deformable sandwiching portions are formed, and wherein the display unit is mounted on the mounting surface so as to be sandwiched by the pair of elastically deformable sandwiching portions.

In the above-mentioned printer according to the one embodiment of the present invention, wherein the display unit is mounted on the mounting surface with a fastening member.

In the above-mentioned printer according to the one embodiment of the present invention, wherein, on both sides of the mounting surface, a pair of grooves are formed so as to be opposed to each other along the both sides, and wherein the display unit is mounted on the mounting surface through insertion of both sides of the display unit into the pair of grooves.

DETAILED DESCRIPTION OF THE PREFERRED EMBODIMENTS

First Embodiment

Figure 1:
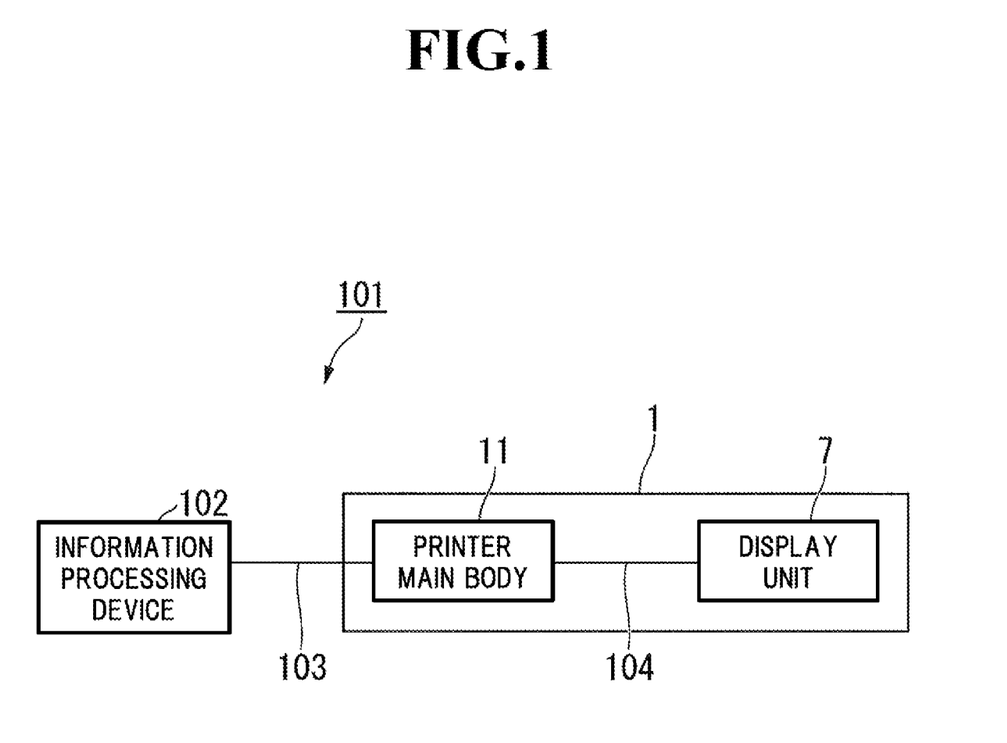
FIG. 1 is a block diagram of a POS including a thermal printer according to a first embodiment of the present invention.

Now, a first embodiment of the present invention is described with reference to the drawings. FIG. 1 is a block diagram of a point-of-sale system (POS) including a thermal printer according to the first embodiment. A POS 101 is installed in commercial places such as retail stores and restaurants. The POS 101 is a system configured to notify customers of payment information (predetermined information) such as names and prices of products purchased by the customers.

As illustrated in FIG. 1, the POS 101 includes an information processing device 102 and a thermal printer 1 (corresponding to the "printer" in claims). The information processing device 102 is configured to perform, for example, payment processing for the products. The information processing device 102 is configured to control the operation of the thermal printer 1. As examples of the information processing device 102, there are given personal computers of a desktop type and a tablet type. The thermal printer 1 is installed on a store counter.

The thermal printer 1 includes a printer main body 11 and a display unit 7. The printer main body 11 and the information processing device 102 are connected to each other through a first cable 103, for example, a universal serial bus (USB) cable. The printer main body 11 and the information processing device 102 may be wirelessly connected to each other. The operation of the printer main body 11 is controlled by the information processing device 102. The printer main body 11 is configured to print data such as payment information sent from the information processing device 102 on recording paper P (see FIG. 2) such as heat-sensitive paper and deliver the printed recording paper P.

The display unit 7 and the printer main body 11 are connected to each other through a second cable 104, for example, a USB cable. With this, the display unit 7 receives electric power supplied from the printer main body 11. The display unit 7 is connected to the information processing device 102 through intermediation of the printer main body 11. With this, the display unit 7 displays the data such as payment information sent from the information processing device 102.

Figure 2:
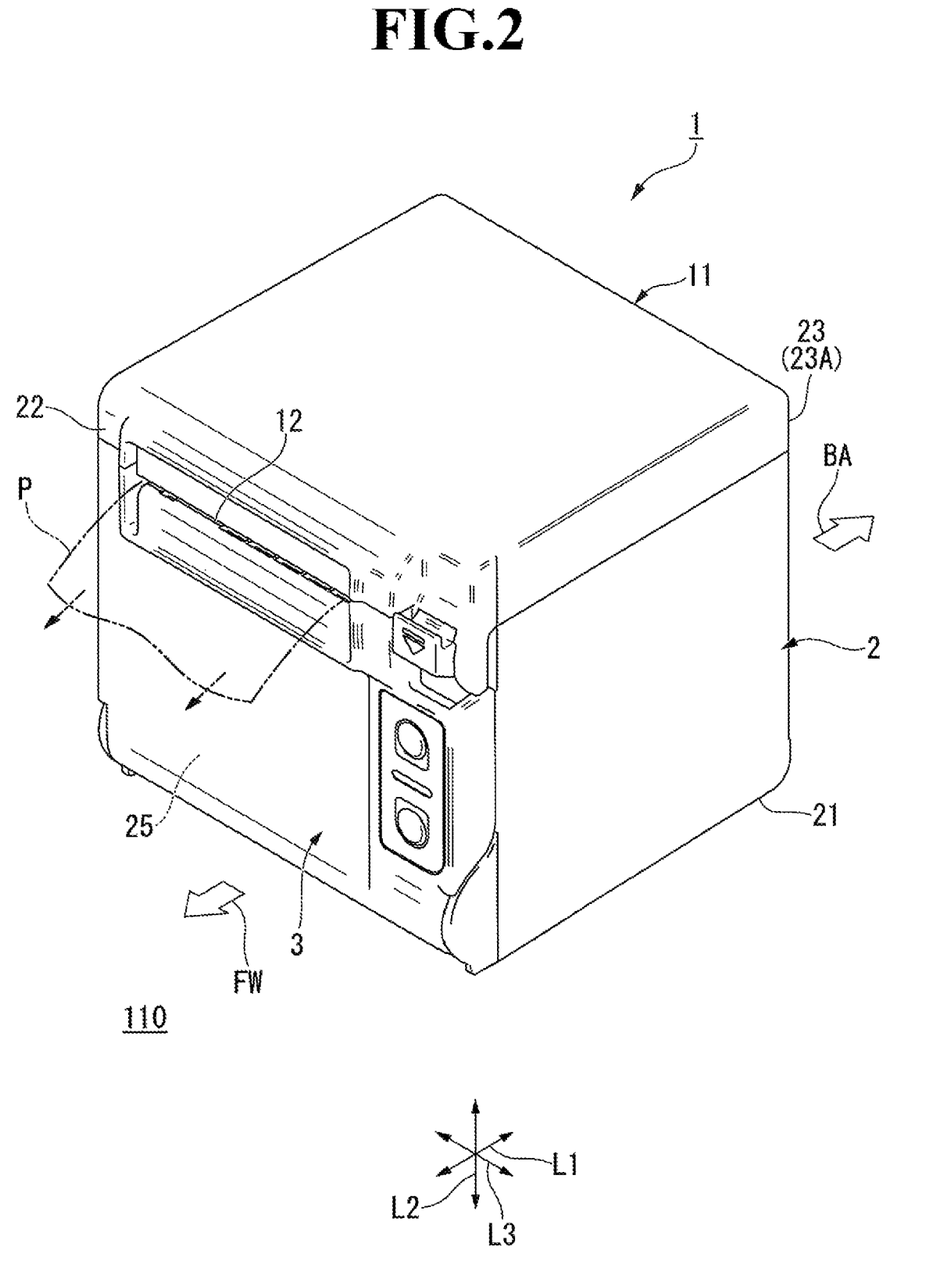
FIG. 2 is a perspective view of the thermal printer according to the first embodiment in a state in which a printer cover is closed.
Figure 3:
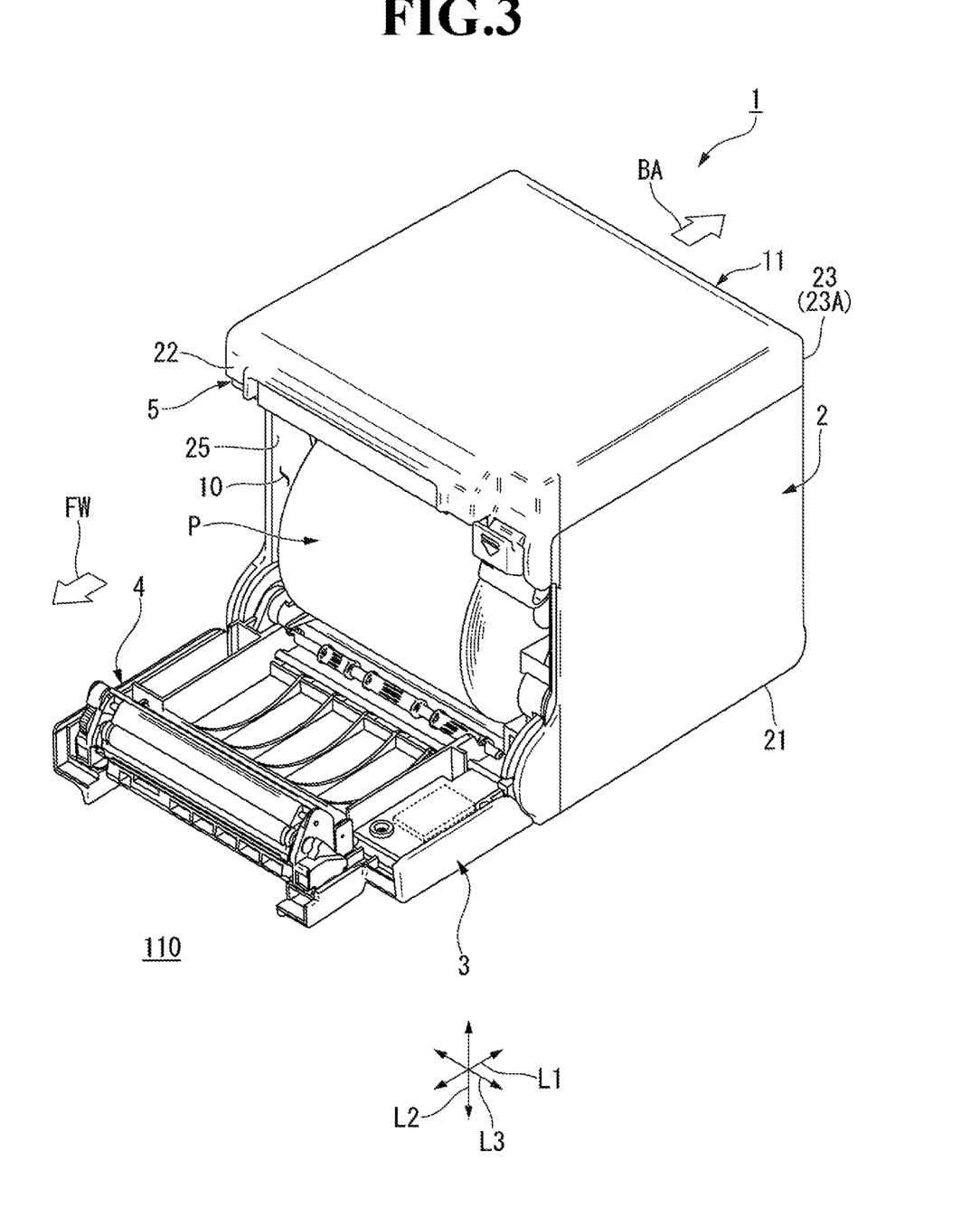
FIG. 3 is a perspective view of the thermal printer according to the first embodiment in a state in which the printer cover is opened.

FIG. 2 is a perspective view of the thermal printer according to the first embodiment in a state in which a printer cover is closed. FIG. 3 is a perspective view of the thermal printer according to the first embodiment in a state in which the printer cover is opened. In FIG. 2 and subsequent figures, an upper side of the drawing sheet is defined as an upward direction (upward direction in a gravity direction), and a lower side of the drawing sheet is defined as a downward direction (downward direction in the gravity direction). Further, a front-and-back direction is denoted by L1. An up-and-down direction is denoted by L2. A direction orthogonal to the front-and-back direction L1 and the up-and-down direction L2 is defined as a right-and-left direction L3. Further, a forward direction is indicated by the arrow FW, and a backward direction is indicated by the arrow BA.

As illustrated in FIG. 2, the thermal printer 1 is a printer of a "forward delivery" type in which the recording paper P is delivered in the forward direction (on a front surface 22 side of the thermal printer 1). The thermal printer 1 is used in a state in which the forward direction thereof is directed to, for example, a store clerk who is a first user, and the backward direction thereof is directed to, for example, a store customer who is a second user. This usage state of the thermal printer 1 is merely an example, and there is no particular limitation on the usage state.

The printer main body 11 includes a housing 2 and a printer cover 3. The housing 2 is installed on an installation surface 110 in a store. As illustrated in FIG. 3, the housing 2 has a box shape having an opening 25 in the forward direction. The housing 2 has a plurality of outer surfaces including a bottom surface 21, the front surface 22, and a back surface 23. The bottom surface 21 is formed, in a large part, so as to be opposed to the installation surface 110 in a state of being separated therefrom. The front surface 22 is formed of the printer cover 3 arranged in the opening 25. The back surface 23 forms a mounting surface 23A on which the display unit 7 (see FIG. 4 and FIG. 5) described later is removably mounted. The mounting surface 23A is positioned on a side opposite to the front surface 22.

As illustrated in FIG. 2, the printer cover 3 is coupled to a lower part of the housing 2 so as to open and close the opening 25 of the housing 2. A delivery slot 12 (gap) is formed between a distal end part of the printer cover 3 and the housing 2. The recording paper P is delivered in the forward direction from an inside of the housing 2 through the delivery slot 12. As illustrated in FIG. 3, the recording paper receiving portion 10 is formed in the housing 2. The recording paper P is received in the recording paper receiving portion 10 in a state of being wound into a tubular shape having an axial line extending along the right-and-left direction L3.

A platen unit 4 is provided on a back surface of the printer cover 3. The platen unit 4 is a component of the printer main body 11. The platen unit 4 is configured to send out the recording paper P in the forward direction from the delivery slot 12 (see FIG. 2).

A head unit 5 is provided in the upward direction of the recording paper receiving portion 10 in the housing 2. The head unit 5 is a component of the printer main body 11. The head unit 5 is electrically connected to the information processing device 102 through the first cable 103. The head unit 5 is configured to print, on the recording paper P, data such as payment information sent from the information processing device 102.

Figure 4:
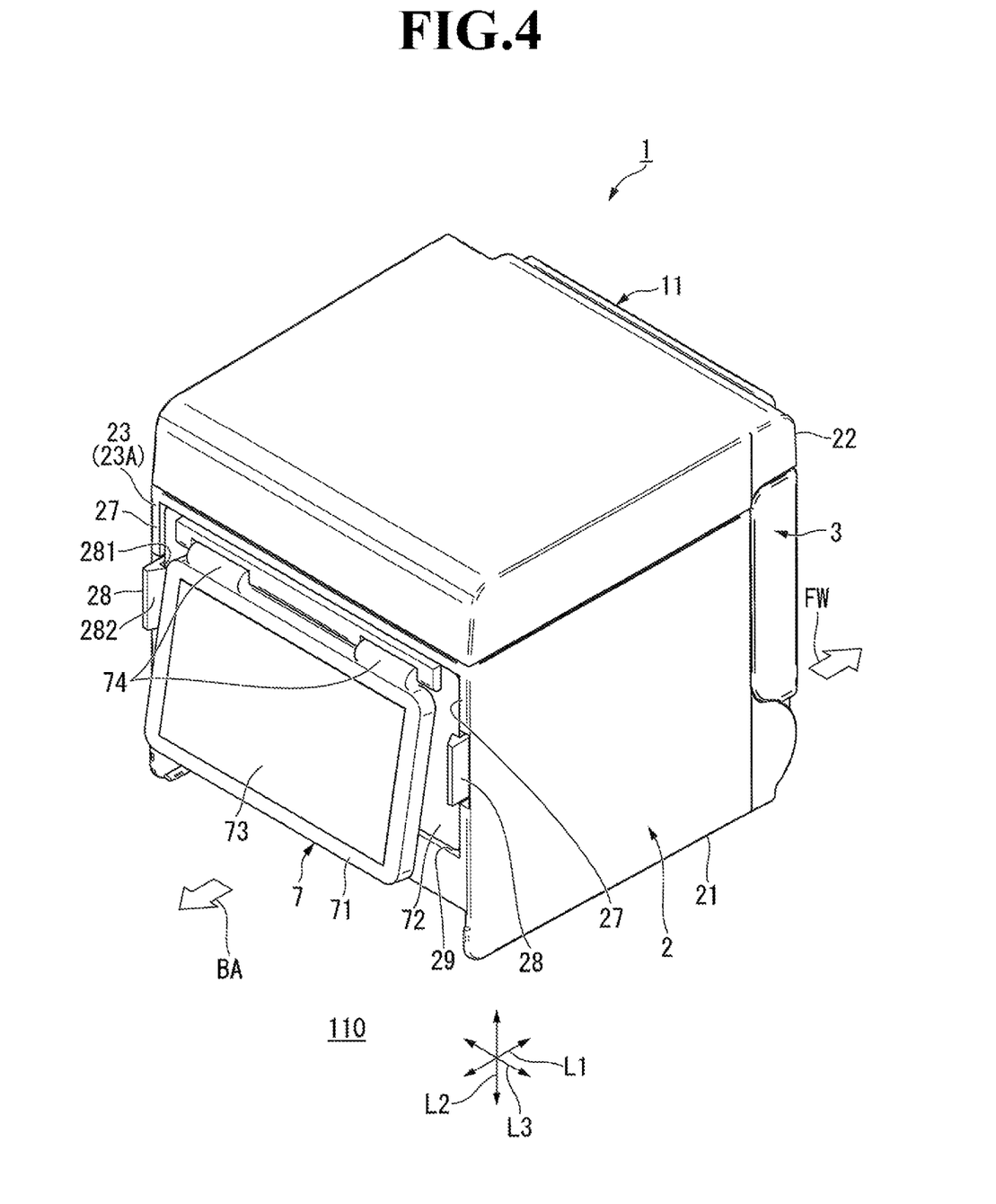
FIG. 4 is a perspective view of the thermal printer according to the first embodiment when viewed from a back surface side.
Figure 5:
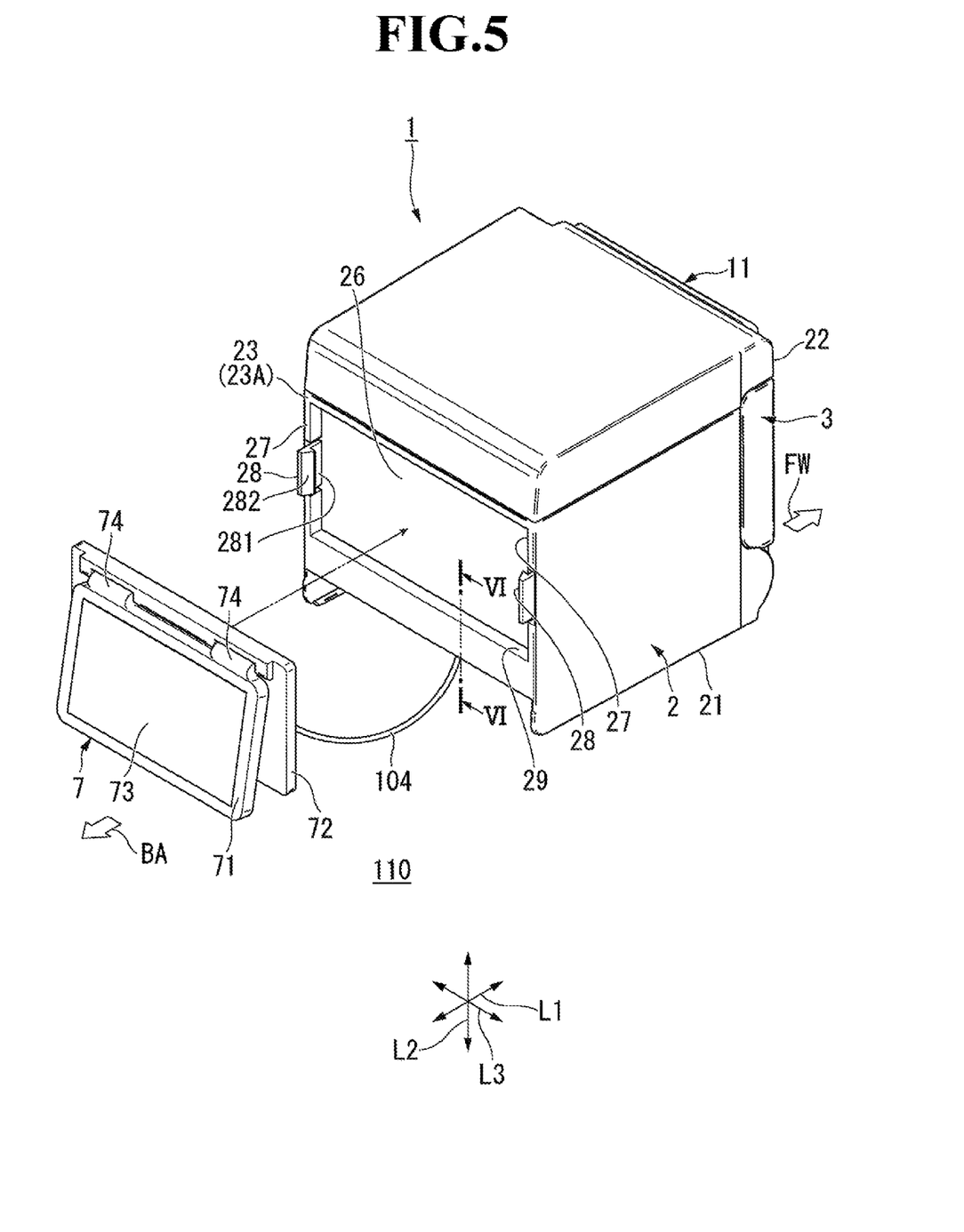
FIG. 5 is an exploded perspective view of the thermal printer according to the first embodiment.

FIG. 4 is a perspective view of the thermal printer according to the first embodiment when viewed from the back surface side. FIG. 5 is an exploded perspective view of the thermal printer according to the first embodiment. As illustrated in FIG. 4 and FIG. 5, the display unit 7 is removably mounted on the mounting surface 23A of the housing 2. The display unit 7 includes a display unit main body 71 and a display unit mounting portion 72.

The display unit main body 71 has a plate shape. One end of the second cable 104 (see FIG. 5) is connected to the display unit main body 71. One end of the second cable 104 may be removably connected to the display unit main body 71, for example, through a connector (not shown). A display screen 73 (corresponding to the "display region" in claims) is provided on the display unit main body 71. Data such as payment information sent from the information processing device 102 are displayed in forms of characters and images on the display screen 73. The size of the display screen 73 (size of the display region) is set to a region corresponding to the mounting surface 23A.

As illustrated in FIG. 5, the display unit mounting portion 72 has a plate shape. The display unit mounting portion 72 is mounted on the mounting surface 23A of the housing 2. An upper part of the display unit mounting portion 72 is pivotally mounted on an upper part of the display unit main body 71 through intermediation of pivot portions 74 formed of, for example, hinges. With the pivot portions 74, the display screen 73 of the display unit main body 71 can be changed in angle with respect to the mounting surface 23A.

A display unit arrangement portion 26 is formed so as to be recessed in the mounting surface 23A of the housing 2. The display unit mounting portion 72 is arranged in the display unit arrangement portion 26. The movement of a lower part of the display unit mounting portion 72 is regulated by holding the lower part of the display unit mounting portion 72 in abutment against a step portion 29 on a lower side of the display unit arrangement portion 26.

A pair of sandwiching portions 28 and 28 are arranged so as to be opposed to each other in edge portions 27 and 27 on the right and left sides of the display unit arrangement portion 26. The pair of sandwiching portions 28 and 28 are formed so as to be elastically deformable. The right and left sides of the display unit mounting portion 72 are sandwiched by the pair of sandwiching portions 28 and 28 through use of elastic force. In this embodiment, the right and left sides of the display unit mounting portion 72 are sandwiched by the pair of sandwiching portions 28 and 28 through snap-fitting.

A specific configuration of the sandwiching portion 28 is described. The sandwiching portion 28 includes a base portion 281 and a locking claw 282. The base portion 281 is connected to the edge portion 27. The base portion 281 extends in the up-and-down direction L2 that is an extending direction of the edge portion 27 and protrudes in the backward direction. The locking claw 282 is formed at a distal end of the base portion 281. The locking claw 282 has a triangular shape in cross section. The display unit mounting portion 72 is locked on inner sides of the locking claws 282 and 282 with elastic force of the base portions 281. The display unit 7 can be mounted on and removed from the mounting surface 23A by elastically deforming the base portions 281 and 281 of the pair of sandwiching portions 28 and 28.

Figure 6:
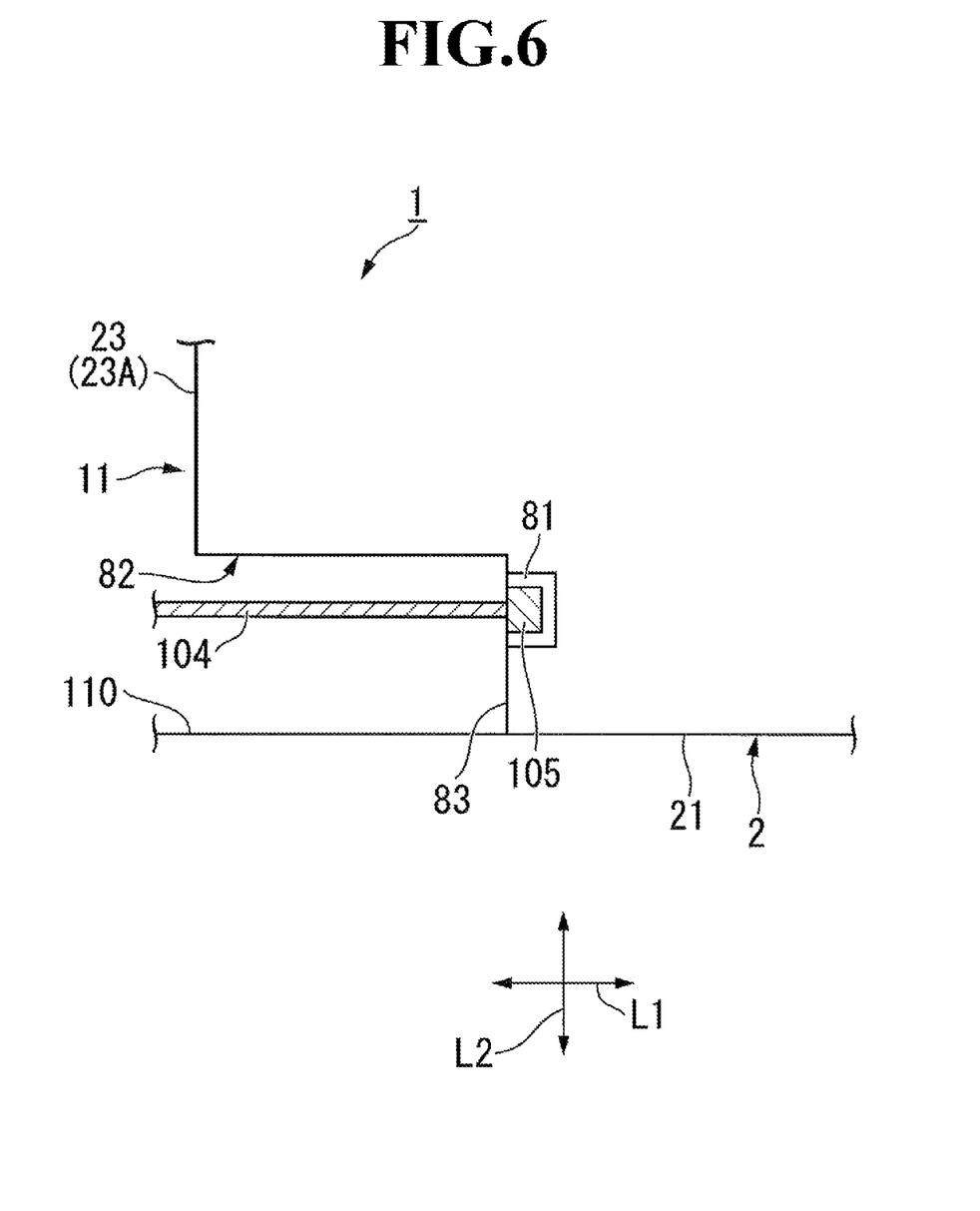
FIG. 6 is a sectional view of the thermal printer taken along the line VI-VI of FIG. 5.

FIG. 6 is a sectional view of the thermal printer taken along the line VI-VI of FIG. 5. As illustrated in FIG. 6, a recessed portion 82 is formed in a lower part of the mounting surface 23A. The recessed portion 82 is formed so as to be recessed inward from the mounting surface 23A (toward an inner side of the housing 2). The recessed portion 82 has an L-shape in side sectional view. A connector connecting portion 81 is formed in the recessed portion 82. The connector connecting portion 81 is formed on a side surface 83 facing the front-and-back direction L1 in the recessed portion 82. A connector 105 mounted on the second cable 104 is connected to the connector connecting portion 81 so as to be mountable on and removable from the connector connecting portion 81 through insertion and removal of the connector 105 along the front-and-back direction L1. For example, a locking portion capable of accommodating the second cable 104 by locking the second cable 104 may be formed in the recessed portion 82.

According to this embodiment, the display unit 7 is removably mounted on the mounting surface 23A of the housing 2 other than the bottom surface 21 among the plurality of outer surfaces. Therefore, the display unit 7 can be supported without the printer stand used in the related art. With this, an installation space for the printer stand is not required. Thus, even when the display unit 7 connected through the second cable 104 is provided, space saving can be achieved as compared to the related art. Further, the printer stand is not required, and hence the thermal printer 1 including the display unit 7 connected through the second cable 104 can be installed at low cost. Further, the display unit 7 can be mounted on and removed from the mounting surface 23A of the housing 2. Therefore, the thermal printer 1 can be adapted for a user who does not require the display unit 7 as well as a user who requires the display unit 7. Thus, the thermal printer 1, which is excellent in versatility and has a high degree of freedom in design, can be obtained.

Further, according to this embodiment, the mounting surface 23A on which the display unit 7 is mounted is a side surface on a side opposite to the opening 25 in which the printer cover 3 is arranged among the plurality of outer surfaces. Therefore, the display unit 7 can be provided on a side opposite to the printer cover 3. In general, the delivery slot 12 of the recording paper P of the thermal printer 1 is formed on the opening 25 side in many cases. Thus, according to this embodiment, the thermal printer 1 can be used in a state in which the delivery slot 12 of the recording paper P of the thermal printer 1 is directed to the first user (for example, the store clerk) and the display unit 7 of the thermal printer 1 is directed to the second user (for example, the store customer). Therefore, the thermal printer 1, which is easy to use and excellent in operability, can be obtained.

Further, according to this embodiment, the size of the display screen 73 is set to the region corresponding to the mounting surface 23A. Therefore, the predetermined information can be displayed on the display screen 73 of the display unit 7 while being enlarged to the largest possible size. Thus, the thermal printer 1 according to this embodiment enables a user to easily visually recognize the predetermined information.

Further, according to this embodiment, the display unit 7 is mounted on the mounting surface 23A while being sandwiched by the pair of sandwiching portions 28 and 28. Therefore, the display unit 7 can be easily mounted on and removed from the mounting surface 23A by elastically deforming the pair of sandwiching portions 28 and 28. Thus, according to this embodiment, the thermal printer 1, which is easy to use and excellent in operability, can be obtained.

Further, according to this embodiment, the connector connecting portion 81 is formed in the lower part of the mounting surface 23A. Therefore, the connector 105 provided at another end of the second cable 104 is connected to the lower part of the mounting surface 23A through intermediation of the connector connecting portion 81. With this, the second cable 104 is prevented from being caught by other components, for example, at a time of use or transport, and hence the connector 105 of the second cable 104 can be prevented from being unexpectedly removed from the connector connecting portion 81.

Further, according to this embodiment, the connector connecting portion 81 is formed in the recessed portion 82 that is recessed inward from the mounting surface 23A. Therefore, the connector 105 at another end of the second cable 104 is connected to the lower part of the mounting surface 23A through intermediation of the connector connecting portion 81 in the recessed portion 82. With this, the second cable 104 can be accommodated in the recessed portion 82, and exposure of the connector 105 to outside is suppressed. Thus, the connector 105 of the second cable 104 can be further prevented from being unexpectedly removed from the connector connecting portion 81.

Second Embodiment

Figure 7:
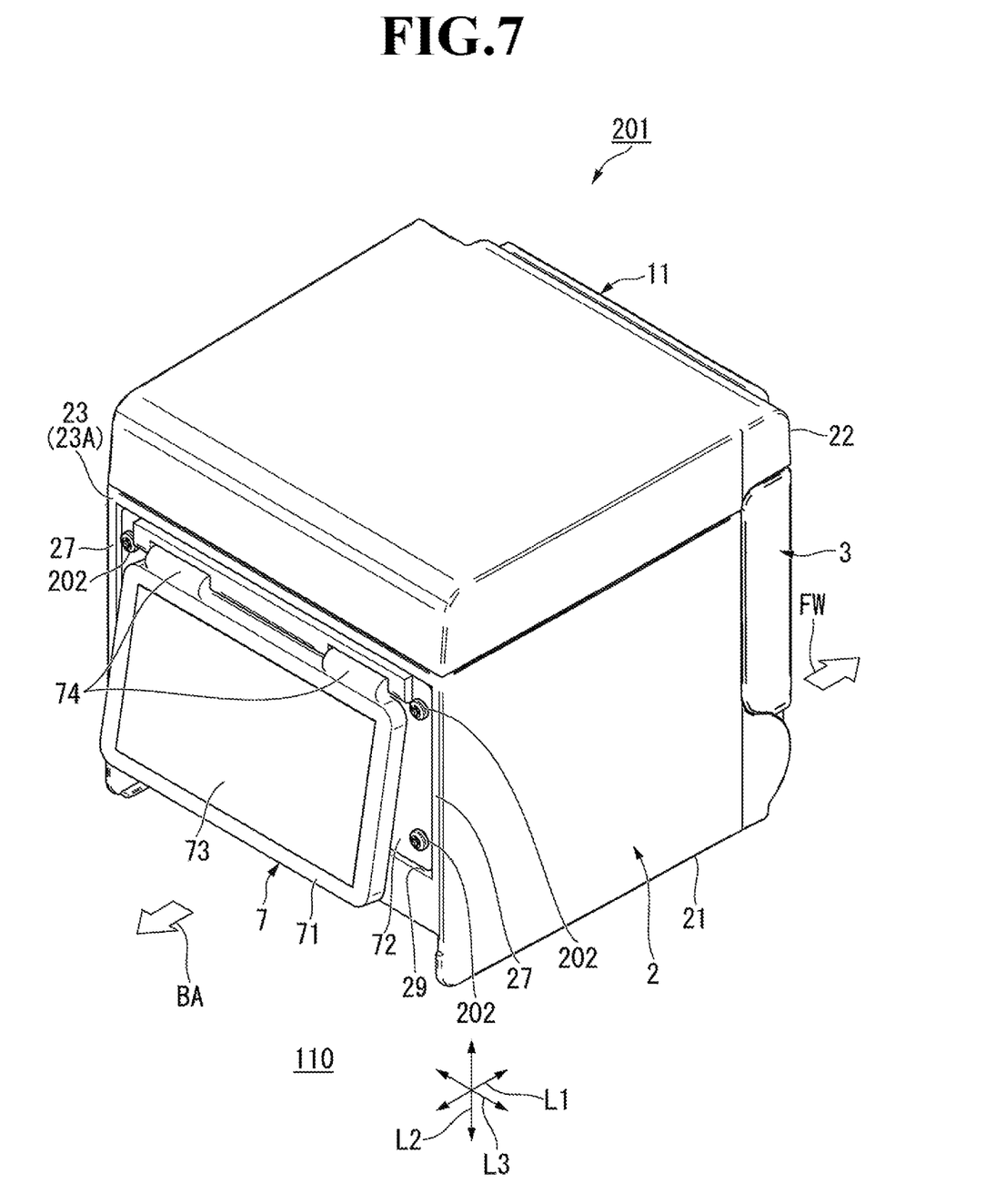
FIG. 7 is a perspective view of a thermal printer according to a second embodiment of the present invention when viewed from a back surface side.
Figure 8:
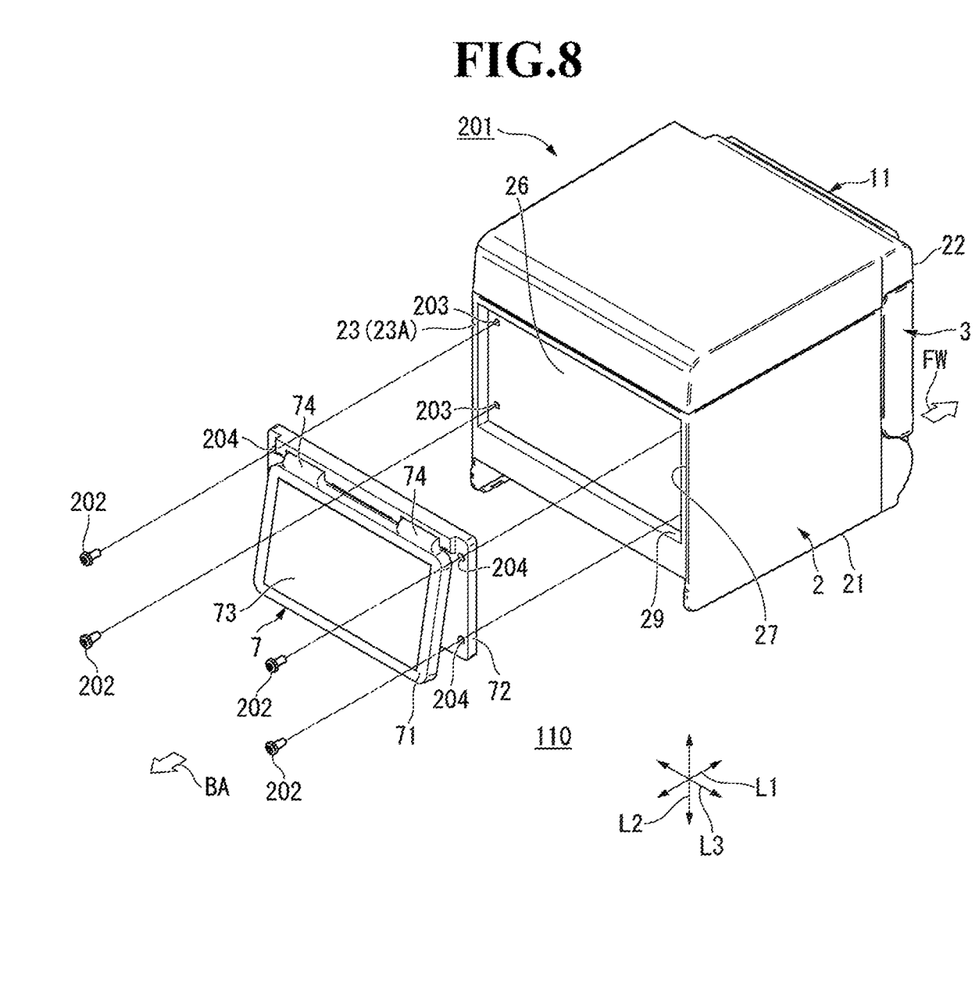
FIG. 8 is an exploded perspective view of the thermal printer according to the second embodiment.

Next, a thermal printer 201 according to a second embodiment of the present invention is described. FIG. 7 is a perspective view of the thermal printer according to the second embodiment when viewed from a back surface side. FIG. 8 is an exploded perspective view of the thermal printer according to the second embodiment. In FIG. 8, illustration of the second cable 104 connecting the display unit 7 and the housing 2 to each other is omitted. In the thermal printer 201 according to the second embodiment, the display unit 7 is removably mounted on the mounting surface 23A of the housing 2 with a configuration different from that of the first embodiment. This configuration is described below. Description of the same configuration as that of the first embodiment is omitted.

As illustrated in FIG. 7 and FIG. 8, the display unit 7 of the thermal printer 201 according to the second embodiment is removably mounted on the mounting surface 23A of the housing 2 with a plurality of screws 202 (corresponding to the "fastening member" in claims). In the mounting surface 23A of the housing 2, a plurality of female thread portions 203 are formed in the display unit arrangement portion 26. The plurality of female thread portions 203 are arranged at four corners of the display unit arrangement portion 26. A plurality of through holes 204 are formed in the display unit mounting portion 72 of the display unit 7. The plurality of through holes 204 are arranged at four corners of the display unit mounting portion 72, which are positions corresponding to the plurality of female thread portions 203 in the display unit mounting portion 72. The plurality of screws 202 are inserted into the through holes 204 of the display unit mounting portion 72 to be threadedly engaged with the plurality of female thread portions 203. With this, the display unit 7 is removably mounted on the mounting surface 23A of the housing 2 with the plurality of screws 202.

According to this embodiment, the display unit 7 is mounted on the mounting surface 23A by threadedly engaging the plurality of screws 202 with the female thread portions 203. Therefore, the display unit 7 can be reliably and firmly mounted on the mounting surface 23A. Thus, according to this embodiment, the display unit 7 can be prevented from being unexpectedly removed from the mounting surface 23A due to vibration or the like. Further, the display unit 7 can be easily removed from the mounting surface 23A of the housing 2 by releasing the screws 202 from the female thread portions 203. Thus, according to this embodiment, the mounting and removing operation of the display unit 7 can be easily performed.

Third Embodiment

Figure 9:
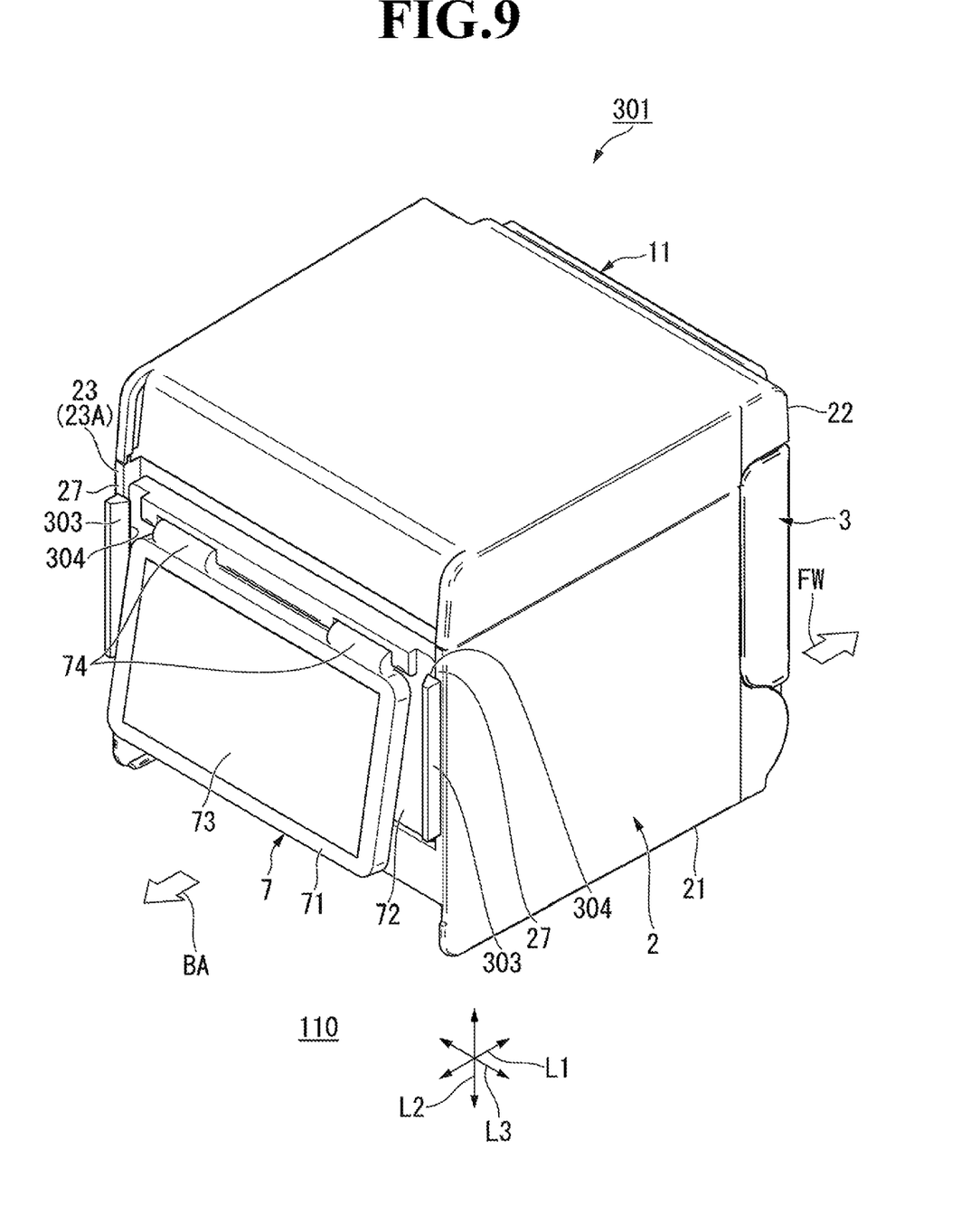
FIG. 9 is a perspective view of a thermal printer according to a third embodiment of the present invention when viewed from a back surface side.
Figure 10:
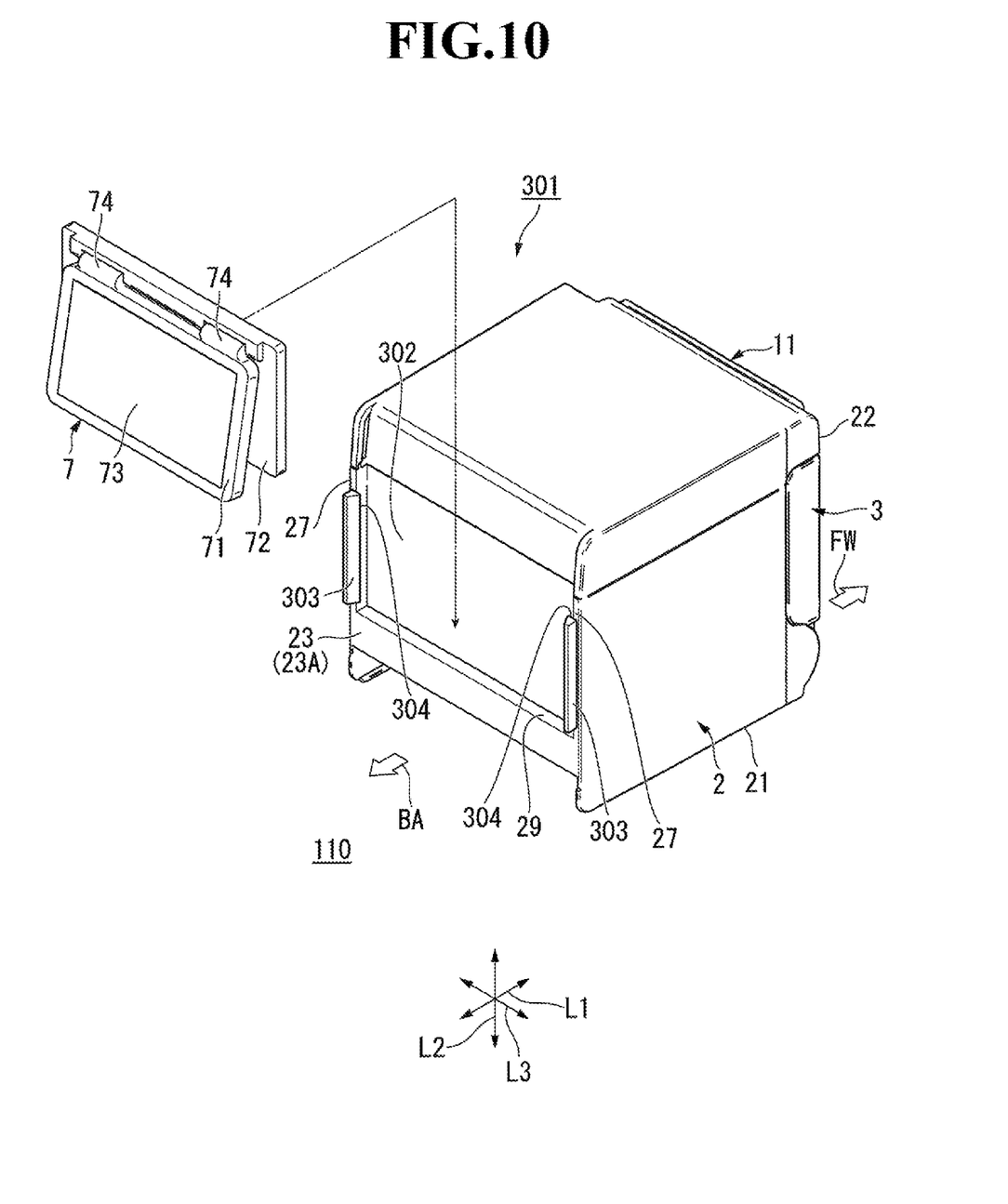
FIG. 10 is an exploded perspective view of the thermal printer according to the third embodiment.

Next, a thermal printer 301 according to a third embodiment of the present invention is described. FIG. 9 is a perspective view of the thermal printer according to the third embodiment when viewed from a back surface side. FIG. 10 is an exploded perspective view of the thermal printer according to the third embodiment. In FIG. 10, illustration of the second cable 104 connecting the display unit 7 and the housing 2 to each other is omitted. In the thermal printer 301 according to the third embodiment, the display unit 7 is removably mounted on the mounting surface 23A of the housing 2 with a configuration different from those of the first embodiment. This configuration is described below. Description of the same configuration as that of the first embodiment is omitted.

As illustrated in FIG. 9 and FIG. 10, a display unit arrangement portion 302 is formed so as to be recessed in the mounting surface 23A of the housing 2. Unlike the display unit arrangement portion 26 in the first embodiment and the second embodiment (see FIG. 5 and FIG. 8), the display unit arrangement portion 302 is formed with an upper side thereof being opened. With this, the display unit mounting portion 72 of the display unit 7 can be slid to be inserted into the display unit arrangement portion 302 of the housing 2 from above. A pair of holding portions 303 and 303 are arranged so as to be opposed to each other in the edge portions 27 and 27 on the right and left sides of the display unit arrangement portion 302. The pair of holding portions 303 and 303 are formed so as to extend along the edge portions 27 and 27. The holding portion 303 has a trapezoidal shape in cross section having a short side in the backward direction and a long side in the forward direction. A pair of grooves 304 and 304 are formed between the display unit arrangement portion 302 of the mounting surface 23A and the pair of holding portions 303 and 303.

The pair of grooves 304 and 304 are arranged so as to be opposed to each other along the edge portions on the right and left sides of the display unit arrangement portion 302. The display unit mounting portion 72 of the display unit 7 is fitted in the display unit arrangement portion 302 with the right and left sides of the display unit mounting portion 72 being inserted in the pair of grooves 304 and 304. With this, the display unit 7 is removably mounted on the mounting surface 23A of the housing 2. The lower part of the display unit mounting portion 72 is brought into abutment against the step portion 29 on a lower side of the display unit arrangement portion 302 to be locked thereon. With this, the display unit 7 is held by the pair of holding portions 303 and 303 and the step portion 29 to be removably mounted on the mounting surface 23A of the housing 2.

According to this embodiment, the display unit 7 is mounted on the mounting surface 23A through insertion of both sides of the display unit 7 into the pair of grooves 304 and 304. Therefore, the display unit 7 can be easily mounted on and removed from the mounting surface 23A by only sliding the display unit 7 along the grooves 304. Thus, according to the present invention, the mounting and removing operation of the display unit 7 can be easily performed.

Note that, the technical scope of the present invention is not limited to the above-mentioned embodiment, but various modifications may be made without departing from the gist of the present invention.

In the above-mentioned embodiments, the display unit 7 includes the display unit main body 71 and the display unit mounting portion 72. However, the display unit 7 may be formed of only the display unit main body 71, and the display unit main body 71 may be directly mounted on the mounting surface 23A. Further, in the above-mentioned embodiments, as an example of the predetermined information to be displayed on the display unit 7, there is given payment information. However, information such as store information and bargain information may be displayed besides the payment information. Further, required information may be displayed in accordance with a place of use of the thermal printers 1, 201, and 301.

In the above-mentioned embodiments, the mounting surface 23A on which the display unit 7 is mounted is formed on the back surface 23 on a side opposite to the front surface 22 having an opening. However, the position of the mounting surface 23A is not limited to that in the above-mentioned embodiments. Thus, for example, the mounting surface 23A may be formed on any one of right and left side surfaces adjacent to the front surface 22, or on an upper surface on a side opposite to the bottom surface 21.

In the above-mentioned embodiments, description is given of the example in which the present invention is applied to the thermal printers 1, 201, and 301 of the forward delivery type in which the recording paper P is delivered in the forward direction. However, besides the foregoing, the present invention may be applied to, for example, a thermal printer of an upward delivery type in which the recording paper P is delivered in the upward direction. Further, in the above-mentioned embodiments, description is given of the example in which the present invention is applied to the thermal printers 1, 201, and 301 as an example of the printer.

However, besides the foregoing, the present invention may be applied to printers other than the thermal printers 1, 201, and 301. For example, the present invention may be applied to an inkjet printer in which printing is performed on recording paper through use of ink droplets.

In the first embodiment, the pair of sandwiching portions 28 and 28 are arranged so as to be opposed to each other in the edge portions 27 and 27 on the right and left sides of the display unit arrangement portion 26, and the display unit mounting portion 72 is sandwiched by the pair of sandwiching portions 28 and 28. Meanwhile, the number of pairs of the sandwiching portions 28 and 28 is not limited to one pair. A plurality of pairs of sandwiching portions 28 and 28 may be arranged, and the display unit mounting portion 72 may be sandwiched by the plurality of pairs of sandwiching portions 28 and 28.

In the thermal printer 301 according to the third embodiment, with the pair of grooves 304 and 304 formed on the right and left sides of the mounting surface 23A, the display unit mounting portion 72 of the display unit 72 can be slid to be inserted into the display unit arrangement portion 302 of the housing 2 from above. Meanwhile, the display unit mounting portion 72 of the display unit 7 may be slid to be inserted into the display unit arrangement portion 302 of the housing 2 from any one of the right direction and the left direction with the pair of grooves 304 and 304 formed on the upper and lower sides of the mounting surface 23A.

Besides the above, the components in the above-mentioned embodiments may be replaced by well-known components as appropriate without departing from the gist of the present invention. The above-mentioned modified examples may be combined with each other as appropriate.

What is claimed is:

1. A printer, comprising:
   a housing, which has a recording paper receiving portion having an opening, and includes a plurality of outer surfaces including a bottom surface to be opposed to an installation surface;
   a printer cover, which is coupled to the housing, and is capable of opening and closing the opening;
   a display unit, which is removably mounted on a mounting surface other than the bottom surface among the plurality of outer surfaces, and is configured to display predetermined information;
   a cable having one end connected to the display unit and another end on which a connector is mounted; and
   a connector connecting portion to which the connector is connected;
   wherein the display unit is mounted on the mounting surface with a fastening member.

2. The printer according to claim 1,
   wherein the housing has a box shape,
   wherein the opening is formed on a side, and
   wherein the mounting surface comprises a side surface on a side opposite to the opening among the plurality of outer surfaces.

3. The printer according to claim 2,
   wherein the display unit includes a display region on which the predetermined information is displayed, and
   wherein the display region has a size set to a region corresponding to the mounting surface.

4. The printer according to claim 3, wherein the connector connecting portion is formed in a lower part of the mounting surface.

5. The printer according to claim 4,
   wherein a recessed portion that is recessed inward from the mounting surface is formed in the lower part of the mounting surface, and
   wherein the connector connecting portion is formed in the recessed portion.

6. The printer according to claim 1, wherein the connector connecting portion is formed in a lower part of the mounting surface.

7. The printer according to claim 6,
   wherein a recessed portion that is recessed inward from the mounting surface is formed in the lower part of the mounting surface, and
   wherein the connector connecting portion is formed in the recessed portion.

8. A printer comprising:
   a housing, which has a recording paper receiving portion having an opening, and includes a plurality of outer surfaces including a bottom surface to be opposed to an installation surface;
   a printer cover, which is coupled to the housing, and is capable of opening and closing the opening;
   a display unit, which is removably mounted on a mounting surface other than the bottom surface among the plurality of outer surfaces, and is configured to display predetermined information;
   a cable having one end connected to the display unit and another end on which a connector is mounted; and
   a connector connecting portion to which the connector is connected;
   wherein the display unit includes a display region on which the predetermined information is displayed, and
   wherein the display region has a size set to a region corresponding to the mounting surface.

9. A printer comprising:
   a housing, which has a recording paper receiving portion having an opening, and includes a plurality of outer surfaces including a bottom surface to be opposed to an installation surface;
   a printer cover, which is coupled to the housing, and is capable of opening and closing the opening;
   a display unit, which is removably mounted on a mounting surface other than the bottom surface among the plurality of outer surfaces, and is configured to display predetermined information;
   a cable having one end connected to the display unit and another end on which a connector is mounted; and
   a connector connecting portion to which the connector is connected;
   wherein the mounting surface has both edge portions in which a pair of elastically deformable sandwiching portions are formed, and
   wherein the display unit is mounted on the mounting surface so as to be sandwiched by the pair of elastically deformable sandwiching portions.

10. A printer comprising:
    a housing, which has a recording paper receiving portion having an opening, and includes a plurality of outer surfaces including a bottom surface to be opposed to an installation surface;
    a printer cover, which is coupled to the housing, and is capable of opening and closing the opening;
    a display unit, which is removably mounted on a mounting surface other than the bottom surface among the plurality of outer surfaces, and is configured to display predetermined information;
    a cable having one end connected to the display unit and another end on which a connector is mounted; and a connector connecting portion to which the connector is connected;

wherein, on both sides of the mounting surface, a pair of grooves are formed so as to be opposed to each other along the both sides, and wherein the display unit is mounted on the mounting surface through insertion of both sides of the display unit into the pair of grooves.

\* \* \* \* \*